No. 753,861. PATENTED MAR. 8, 1904.
J. G. DUCK.
STEAM TRAP.
APPLICATION FILED MAY 2, 1902.
NO MODEL. 2 SHEETS—SHEET 2.
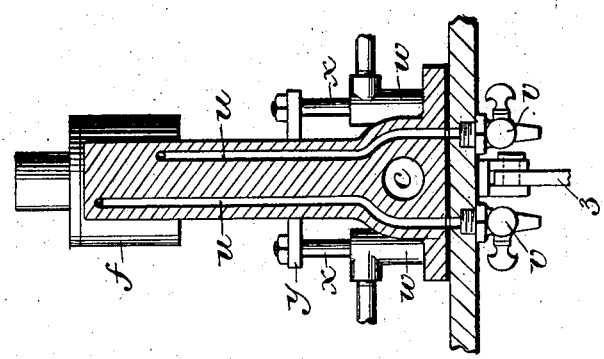

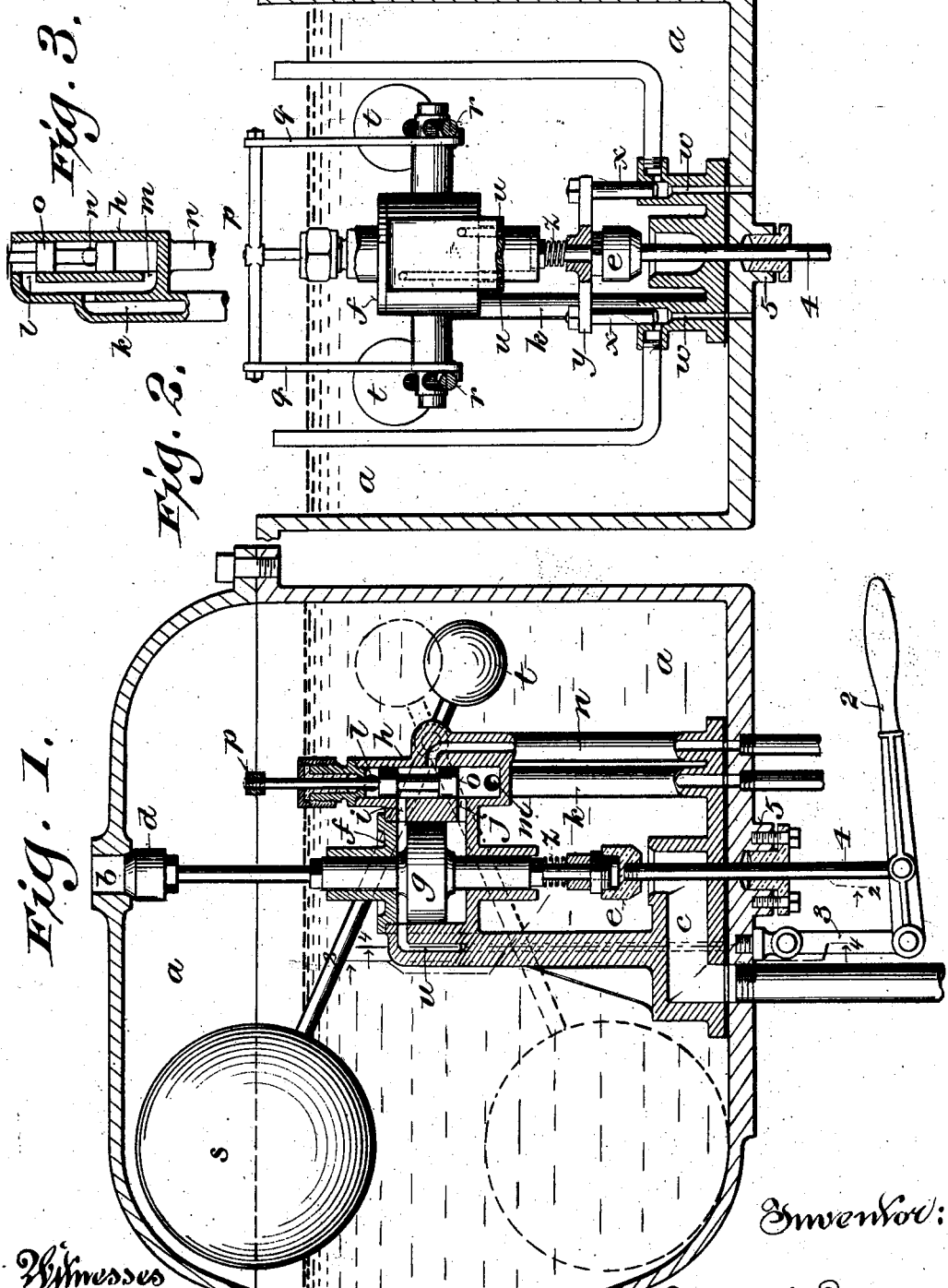

No. 753,861.

Patented March 8, 1904.

UNITED STATES PATENT OFFICE.

JOSEPH G. DUCK, OF MILWAUKEE, WISCONSIN, ASSIGNOR OF ONE-HALF TO JOHN G. THOMPSON, OF MILWAUKEE, WISCONSIN.

STEAM-TRAP.

SPECIFICATION forming part of Letters Patent No. 753,861, dated March 8, 1904.

Application filed May 2, 1902. Serial No. 105,592. (No model.)

*To all whom it may concern:*

Be it known that I, JOSEPH G. DUCK, a citizen of the United States, residing at Milwaukee, in the county of Milwaukee and State of Wisconsin, have invented certain new and useful Improvements in Steam-Traps, of which the following is a specification, reference being had to the accompanying drawings, forming a part thereof.

The main objects of this invention are to produce a trap for pressure or vacuum steam power or heating apparatus that will be positive and reliable in operation and that will not destroy or diminish the vacuum when the trap is connected with a vacuum system or apparatus, and generally to improve the construction and operation of devices of this class.

It consists in certain novel features of construction and in the arrangement and combinations of parts hereinafter particularly described, and pointed out in the claims.

In the accompanying drawings like characters designate the same parts in the several figures.

Figure 1 is a vertical section of a steam-trap embodying my invention. Fig. 2 is a section on the line 2 2, Fig. 1. Fig. 3 is a detail sectional view at right angles to that shown in Fig. 1 of the valve-chamber and fluid-supply connection through which an actuating fluid is supplied for operating the inlet and outlet valves of the trap; and Fig. 4 is a section on the line 4 4, Fig. 1, showing the waste-passages leading from the ends of the cylinder containing the valve-actuating piston.

$a$ is a closed receptacle, which may be made of any desired size and form, according to the use to which the trap is to be applied. It is provided at or near the top with an inlet opening or connection $b$ and at or near the bottom with an outlet opening or connection $c$.

$d$ is a valve for closing the inlet-opening $b$, and $e$ is a valve which normally closes the outlet-opening.

$f$ is an expansion chamber or cylinder, preferably arranged, as shown in Fig. 1, between and in line with the inlet and outlet openings $b$ and $c$. It is provided with a movable part or piston $g$, having stems which are guided in long bearings or sleeves in the cylinder-heads and are connected with the valves $d$ and $e$.

$h$ is a valve-chamber communicating on one side through ports $i$ and $j$ with the cylinder $f$ on opposite sides of the piston $g$.

$k$ is a steam or fluid supply passage branching and opening through ports $l$ and $m$ into the ends of the valve-chamber $h$, and $n$ is an exhaust-passage leading out of said valve-chamber at a point midway between the ports $l$ and $m$. These connections may, however, be reversed, the passage $n$ serving as the supply and the passage $k$ as the exhaust.

The supply-passage connects the valve-chamber $h$ with a source of pressure outside of the trap and independent of the pressure therein, so that the operation of the inlet and outlet valves $d$ and $e$ is insured whether there is pressure in the trap or not, and this outside connection affords convenient means for lubricating the working parts of the valve-operating motor without contaminating the water in the trap with oil, which is very objectionable.

$o$ is a balanced piston-valve having two heads fitted to work in the chamber $h$ and connected with each other by a reduced stem. At one end this valve is connected by a stem passing through a stuffing-box in one end of the valve-case with a cross-head $p$, which is in turn connected by links $q$ with the arms $r$ of a forked or double lever provided at one end with a float $s$ and at the other with counterweights $t$. The lever-arms $r$ are pivoted near the counterweights $t$ to studs projecting on opposite sides of the valve-chamber $h$, as shown in Fig. 2.

$u$ $u$ are waste-passages leading from the ends of the cylinder $f$ to the atmosphere and provided outside of the trap with cocks $v$ $v$ for drawing off any water that may leak into or form by condensation in the cylinder $f$.

When the trap is made for use in connection with a vacuum system or apparatus, it is provided with one or more vent-passages $w$ opening into the upper part of receptacle $a$ and normally closed by valves $x$.

The trap shown for illustration in the drawings as designed for a vacuum system or apparatus is provided with two vent-valves, which are attached to a cross-head $y$, loosely mounted on the stem of the outlet-valve $e$ and pressed toward said valve by a spring $z$. This spring permits the outlet-valve $e$ to close after the vent-valves are seated, thereby permitting the inlet-valve $d$ to be closed, or nearly so, before the vent-valves are opened.

To provide for the manual operation of the valves $d$ and $e$ in case the automatic actuating mechanism should for any reason fail to work, a lever 2, attached by a link 3 to the casing of the trap or other suitable support, is connected with the valve $e$ by a rod 4 passing through a stuffing-box 5 in said casing.

To permit the free movement of the piston $g$ and the operation of the valves $d$ and $e$ or the valve $e$ manually by the lever 2, one or both waste-cocks $v$ $v$ are opened.

When the trap is designed for and used with a pressure system or apparatus, the inlet-valve $d$, the vent-passages $w$, and the valves $x$ are or may be omitted.

The trap as designed for use in connection with a pressure system or apparatus without the inlet-valve $d$ and vent-valves $x$ operates as follows: Water entering through port $b$ gradually fills the receptacle $a$, lifting the float, which when the water reaches a certain level moves the valve $o$ into the position in which it is shown in Fig. 1, admitting the steam or other actuating fluid into the cylinder $f$ below the piston $g$ and releasing the steam or other fluid from said cylinder above the piston, which is thereupon instantly and positively shifted to its upper position, thereby opening the outlet-valve $e$. As the water flows out through the opening or passage $c$ the float $s$ descends until the valve $o$ is carried into a position to release the steam or actuating fluid from the lower end of cylinder $f$ and admit it into the upper end of said cylinder, whereupon the piston $g$ will be instantly and positively shifted to the opposite limit of its movement, thereby closing the valve $e$.

When the trap is designed for use in connection with a vacuum system or apparatus and provided with an inlet-valve $d$ and one or more vent-passages and valves $w$ and $x$, it operates as above explained, except that when the outlet-valve $e$ is opened the inlet-valve $d$ will be closed, thus preventing the loss or diminution of the vacuum in the system or apparatus with which the trap is connected while the trap is being discharged. Upon the closing of the inlet-valve $d$ the vent-valves $x$ are opened, thereby admitting air into the upper part of receptacle $a$ and allowing the water contained in said receptacle to flow freely therefrom through the outlet opening or passage $c$.

Instead of admitting air into the trap through the passages $w$ they may be connected with a steam or other fluid supply for destroying the vacuum or producing pressure in the trap and discharging the same.

The cylinder $f$, the valve-case connected therewith, the outlet-passage $c$, the supply and exhaust passages $k$ and $n$ for the steam or actuating fluid, and the waste-passages $w$ may be conveniently made in a single casting and bolted or otherwise secured with a gasket to the bottom of the trap, as shown in Fig. 1.

Various changes in the details of construction and arrangement of parts may be made within the spirit and intended scope of the invention.

I claim—

1. In a steam-trap the combination with a closed receptacle having inlet and outlet connections, of a valve normally closing the outlet connection, an expansion-chamber provided with a movable part which is connected with and arranged to operate said valve, a fluid-pressure-supply connection leading to said expansion-chamber from a source outside of the trap; a valve controlling the supply of an actuating fluid in said chamber, and a float directly connected with and arranged to operate said last-named valve according to the liquid-level in said receptacle, substantially as described.

2. In a steam-trap the combination of a closed receptacle having inlet and outlet connections, of a valve normally closing the outlet connection, a valve for closing the inlet connection, an expansion-chamber provided with a movable part which is connected with and arranged to operate said valves, a valve controlling the supply of an actuating fluid in said chamber, a float connected with and arranged to operate the last-mentioned valve according to the liquid-level in said receptacle, a vent opening into the upper part of said receptacle and a valve arranged to be operated by said movable part and controlling said vent, substantially as described.

3. In a steam-trap the combination with a closed receptacle having inlet and outlet connections, of a valve normally closing the outlet connection, an expansion-chamber having a movable part which is connected with and arranged to operate said valve, a valve-chamber communicating with said expansion-chamber on opposite sides of said movable part and having fluid supply and exhaust connections, the supply connection leading from a source of fluid-pressure outside and independent of said trap, a balanced piston-valve fitted in said valve-chamber and controlling the admission and release of the actuating fluid to and from said expansion-chamber, and a float directly connected with and arranged to operate said balanced valve, substantially as described.

4. In a steam-trap the combination with a closed receptacle having inlet and outlet connections, of a valve normally closing the outlet connection, a valve for closing the inlet connection, a cylinder, a piston fitted in said cylinder and connected with said valves, a valve-chamber communicating through ports with the ends of said cylinder and having supply and exhaust connections, a balanced valve fitted in said chamber and controlling the admission and release of an actuating fluid to and from said cylinder on opposite sides of the piston, and a float connected with and arranged to operate said balanced valve, substantially as described.

5. In a steam-trap the combination with a closed receptacle having inlet and outlet connections, of a valve normally closing the outlet connection, a valve for closing the inlet connection, a cylinder, a piston fitted in said cylinder and connected with said valves so as to close the inlet-valve when the outlet-valve is opened, a valve-chamber communicating with the ends of said cylinder and having fluid supply and exhaust connections, a valve fitted in said chamber and controlling the admission and release of an actuating fluid to and from said cylinder, a float connected with and arranged to operate the last-mentioned valve, a vent opening into the upper part of said receptacle, and a valve controlling said vent and arranged to be opened by said piston when the inlet-valve is closed, substantially as described.

6. In a steam-trap the combination with a closed receptacle having inlet and outlet connections, of a valve normally closing the outlet connection, a cylinder, a piston fitted in said cylinder and connected with said valve, a valve controlling the admission and release of an actuating fluid to and from said cylinder, a float connected with and arranged to operate the last-mentioned valve, and waste-passages leading out of said receptacle from the ends of said cylinder and provided with cocks, substantially as described.

7. In a steam-trap the combination with a closed receptacle having inlet and outlet connections, of a valve normally closing the outlet connection, an expansion-chamber provided with a movable part which is connected with and arranged to operate said valve, a valve controlling the supply of an actuating fluid in said chamber, a float connected with and arranged to operate the last-mentioned valve, and a connection extending outside of the trap for manually operating said outlet-valve, substantially as described.

8. In a steam-trap the combination with a closed receptacle having inlet and outlet connections, of a valve normally closing the outlet connection, a cylinder arranged within said receptacle and provided within a piston which is connected with said valve, a balanced valve controlling the admission and release of an actuating fluid to and from said cylinder, a float connected with and arranged to operate the last-mentioned valve, and a lever connected with said outlet-valve by a rod passing through a stuffing-box in the wall of said receptacle for manually operating said valve, substantially as described.

9. In a steam-trap the combination with a closed receptacle having inlet and outlet connections, of a valve normally closing the outlet connection, a valve for closing the inlet connection, a chamber provided with a movable part which is connected with and arranged to operate said valves, a valve controlling the supply of an actuating fluid to said chamber, a float connected with and arranged to operate the last-mentioned valve, a vent opening into the upper part of said receptacle, and a valve controlling said vent and having a yielding connection with said movable part whereby the inlet-valve is closed or nearly so, before the vent-valve is opened, substantially as described.

In witness whereof I hereto affix my signature in presence of two witnesses.

JOSEPH G. DUCK.

Witnesses:
VICTORIA OLESKI,
CHAS. L. GOSS.